(12) United States Patent
Yuan et al.

(10) Patent No.: US 10,685,647 B2
(45) Date of Patent: Jun. 16, 2020

(54) SPEECH RECOGNITION METHOD AND DEVICE

(71) Applicant: BAIDU ONLINE NETWORK TECHNOLOGY (BEIJING) CO., LTD., Beijing (CN)

(72) Inventors: Bin Yuan, Beijing (CN); Shouye Peng, Beijing (CN); Yangfei Xu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 161 days.

(21) Appl. No.: 15/780,374

(22) PCT Filed: Jun. 24, 2016

(86) PCT No.: PCT/CN2016/087125
§ 371 (c)(1),
(2) Date: May 31, 2018

(87) PCT Pub. No.: WO2017/096778
PCT Pub. Date: Jun. 15, 2017

(65) Prior Publication Data
US 2018/0374478 A1    Dec. 27, 2018

(30) Foreign Application Priority Data

Dec. 11, 2015  (CN) .......................... 2015 1 0920588

(51) Int. Cl.
*G10L 15/20*    (2006.01)
*G10L 15/22*    (2006.01)
(Continued)

(52) U.S. Cl.
CPC .............. *G10L 15/22* (2013.01); *G10L 15/02* (2013.01); *G10L 15/10* (2013.01); *G10L 15/18* (2013.01);
(Continued)

(58) Field of Classification Search
CPC ....................................................... G10L 15/20
See application file for complete search history.

(56) References Cited

U.S. PATENT DOCUMENTS 5,842,165 A * 11/1998 Raman .................. G10L 15/065
                                                       704/255
6,076,054 A *  6/2000 Vysotsky .............. G10L 15/065
                                                       704/240
(Continued)

FOREIGN PATENT DOCUMENTS

CN         1293428         5/2001
CN         1588535         3/2005
(Continued)

*Primary Examiner* — Shreyans A Patel
(74) *Attorney, Agent, or Firm* — Hodgson Russ LLP (57) ABSTRACT

A speech recognition method and a speech recognition device are disclosed. The speech recognition method includes: obtaining features of a speech signal to be recognized; performing a path search in a search space generated by establishing a map according to the features to output a decoding result; judging whether a rejection is needed according to the decoding result; and when the rejection is needed, determining that a speech recognition result is the rejection, and when the rejection is not needed, obtaining the speech recognition result according to the decoding result. The method has a good recognition rejection effect.

17 Claims, 4 Drawing Sheets

(51) Int. Cl.
- *G10L 25/78* (2013.01)
- *G10L 15/10* (2006.01)
- *G10L 15/02* (2006.01)
- *G10L 15/18* (2013.01)
- *G10L 21/0232* (2013.01)
- *G10L 25/84* (2013.01)

(52) U.S. Cl.
CPC .......... *G10L 21/0232* (2013.01); *G10L 25/78* (2013.01); *G10L 25/84* (2013.01); *G10L 2015/221* (2013.01)

(56) References Cited

U.S. PATENT DOCUMENTS

| | | | |
|---|---|---|---|
| 7,720,683 B1 * | 5/2010 | Vermeulen | G10L 15/22 704/235 |
| 8,560,313 B2 | 10/2013 | Talwar et al. | |
| 2005/0033574 A1 * | 2/2005 | Kim | G10L 15/22 704/251 |
| 2008/0243968 A1 * | 10/2008 | Schmelter | G06F 12/0253 |
| 2011/0087492 A1 * | 4/2011 | Yoshida | G10L 15/08 704/240 |
| 2011/0282663 A1 * | 11/2011 | Talwar | G10L 15/20 704/233 |
| 2014/0297252 A1 * | 10/2014 | Prasad | G06F 17/289 704/2 |
| 2015/0161992 A1 * | 6/2015 | Jung | G10L 15/083 704/251 |

FOREIGN PATENT DOCUMENTS

| | | |
|---|---|---|
| CN | 103077708 | 5/2013 |
| CN | 103325370 | 9/2013 |
| CN | 103915092 | 7/2014 |
| CN | 105489222 | 4/2016 |

* cited by examiner

SPEECH RECOGNITION METHOD AND DEVICE

CROSS-REFERENCE TO RELATED APPLICATION

This application is a U.S. national phase application of International Application No. PCT/CN2016/087125, filed on Jun. 24, 2016, which claims a priority to and benefits of Chinese Patent Application No. 201510920588.7, filed with the State Intellectual Property Office of P. R. China on Dec. 11, 2015 by BAIDU ONLINE NETWORK TECHNOLOGY (BEIJING) CO., LTD., and titled with "speech recognition method and device", the entire contents of which are incorporated herein by reference.

FIELD

The present disclosure generally relates to the field of speech technology, and more particularly, to a speech recognition method and a speech recognition device.

BACKGROUND

Speech technology can provide people with convenient user experience, especially in mobile terminals and wearable devices. At present, speech recognition is mainly realized through on-line service. However, the on-line service cannot satisfy the demand without network or with instable network, and conventional off-line speech recognition systems do not have rejection effect.

SUMMARY

Embodiments of the present disclosure provide a speech recognition method. The method includes: obtaining features of a speech signal to be recognized; performing a path search in a search space generated by establishing a map according to the features to output a decoding result; judging whether a rejection is needed according to the decoding result; and when the rejection is needed, determining that a speech recognition result is the rejection, and when the rejection is not needed, obtaining the speech recognition result according to the decoding result.

Embodiments of the present disclosure provide an electronic device. The device electronic includes: one or more processors; a memory; one or more programs stored in the memory, in which when the one or more programs are executed by the one or more processors, the speech recognition method according to the above embodiments of the present disclosure is performed.

Embodiments of the present disclosure provide a non-transitory computer-readable storage medium having stored therein one or more modules that, when executed by a device, causes the device to perform the speech recognition method according to the above embodiments of the present disclosure.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. In contrast, the present disclosure may include alternatives, modifications and equivalents within the spirit and scope of the appended claims.

Figure 1:
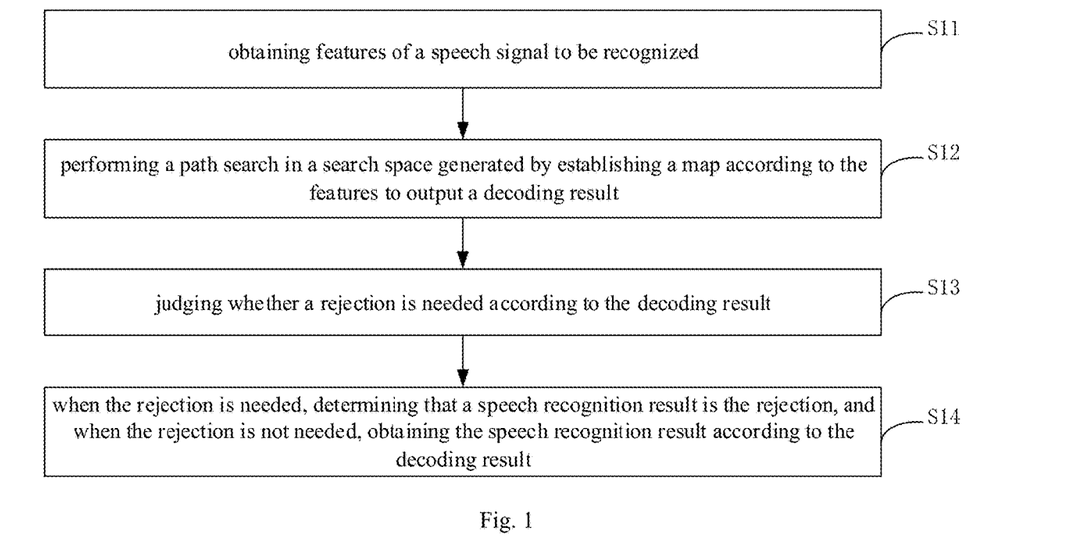
FIG. 1 is a flow chart of a speech recognition method according to an embodiment of the present disclosure.

FIG. 1 is a flow chart of a speech recognition method according to an embodiment of the present disclosure. The method may include followings.

At block S11, features of a speech signal to be recognized are obtained.

Figure 2:
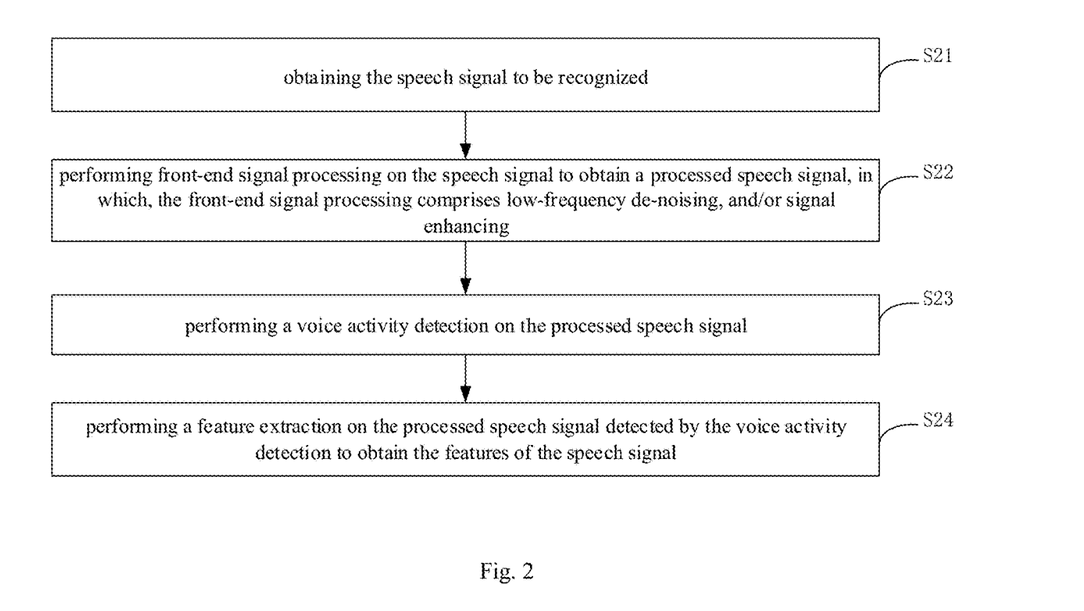
FIG. 2 is a flow chart of obtaining features of a speech signal according to an embodiment of the present disclosure.

For example, with reference to FIG. 2, acts of obtaining the features of the speech signal may include S21 to S24.

At block S21, the speech signal to be recognized is obtained.

Taking off-line speech recognition in an on-board device as an example, the speech signal to be recognized can be detected by a microphone of the on-board device.

It should be understood that, the present disclosure may take the off-line speech recognition as an example, which is locally executed by a client. However, the method of the present disclosure can also be applied to on-line speech recognition, which is executed by an on-line speech recognition server.

At block S22, front-end signal processing is performed on the speech signal to obtain a processed speech signal, in which, the front-end signal processing includes low-frequency de-noising, and/or signal enhancing.

For example, in environments with strong noise such as on-board, or music, air conditioning and sound of wind, and with far-field, when an original signal is directly sent to a decoder, the effect may be bad. Therefore, before sound enters the decoder, it is necessary to perform the low-frequency de-noising on the original signal, so as to eliminate low-frequency noise generated during vehicle travelling. At the same time, in the environment such as on-board, since a user may be far away from the microphone, or because of hardware, a volume of the sound may be small, and it is possible to use a signal amplitude enhancement technology to amplify amplitude of the original signal. The processed speech signal through the front-end signal processing has anti-noise performance.

At block S23, a voice activity detection (VAD for short) is performed on the processed speech signal.

The VAD can detect a start endpoint and an end endpoint of the speech signal.

At block S24, a feature extraction is performed on the processed speech signal detected by the voice activity detection to obtain the features of the speech signal.

After the start endpoint and the end endpoint of the speech signal are detected, the feature extraction can be performed on the speech signal between the two endpoints, so as to obtain the features of the speech signal.

The features of the speech signal may be such as Mel-scale frequency cepstral coefficients (MFCC for short).

At block S12, a path search in a search space generated by establishing a map is performed according to the features to output a decoding result.

Figure 3:
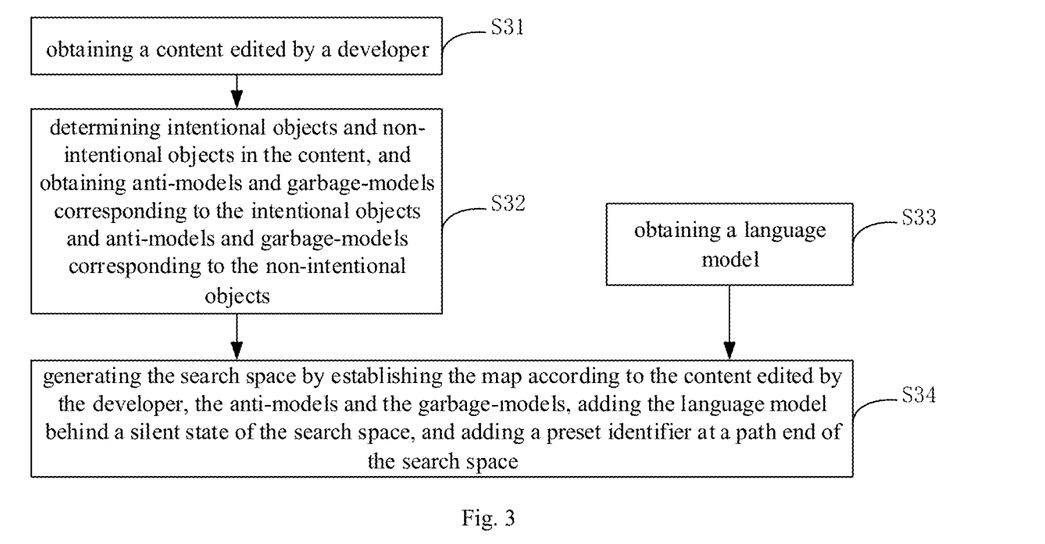
FIG. 3 is a flow chart of establishing a map according to an embodiment of the present disclosure.

In some embodiment, the method may also include acts of generating the search space by establishing the map. With reference to FIG. 3, acts of generating the search space by establishing the map may include S31 to S34.

At block S31, a content edited by a developer is obtained.

For example, a developer syntax editing module is provided to the developer, and the content that the developer inputs through the developer syntax editing module is received.

In the present disclosure, the developer needs to perform the syntax editing according to syntax rules, so as to use in establishing the map.

In the content edited by the developer, for example, an angle bracket < > is used to mark an intentional object including a keyword that the developer desired to output, the content of the intentional object is separated by "|", and at the same time, the intentional object is ended by ";". A parenthesis is used to mark the syntax rule, and a keyword _SCENE_ID_ is used to mark scene ID. Here is an example.

```
<name>=Zhang San |Zheng San| Li Si;
<phoneType>=mobile phone| phone number of company;
<cmd1>=opening a video;
<cmd2>=closing a video;
_SCENE_ID_0
(making a phone call to <name>)
(making a phone call to <phoneType> of <name>)
(giving <name> a phone call)
_SCENE_ID_1
(<cmd1>)
(<cmd2>)
```

At block S32, intentional objects and non-intentional objects in the content are determined, and anti-models and garbage-models corresponding to the intentional objects and anti-models and garbage-models corresponding to the non-intentional objects are obtained.

For example, the object marked by the angle bracket < > is called as the intentional object, for example, the above "name", "phoneType", "cmd1" and "cmd2" are intentional objects. The non-intentional objects are the content edited by the developer excluding the intentional objects, for example, "making a phone call to" belongs to the non-intentional object.

The content in the intentional object is called as the keyword, for example, corresponding to the intentional object name, Zhang San, Zheng San, and Li Si are keywords.

After the intentional objects and the non-intentional objects are determined, the anti-model and the garbage-model corresponding to the intentional object can be obtained, and the anti-model and the garbage-model corresponding to the non-intentional object can be obtained.

The garbage-model can be a pre-configured static model, and the anti-model can be dynamically generated according to the intentional object or the non-intentional object.

For example, corresponding to the non-intentional object "making a phone call to", the pre-configured garbage-model that includes multiple garbage words can be loaded, and the anti-model can be dynamically generated according to a preset rule. The anti-model may be such as some content that begins with "making" but excluding "making a phone call".

After that, the search space may be generated by establishing the map according to the content edited by the developer, the anti-models and the garbage-models.

For example, the path can be generated according to the content edited by the developer. For example, according to the above example content edited by the developer, there will be a path of "making a phone to"—"Zhang San". And, the garbage-model and the anti-model can be added to the path that is generated according to the content edited by the developer. For example, corresponding to the non-intentional object "making a phone to", the corresponding garbage-model and anti-model can be added.

In some embodiments, with reference to FIG. 3, the method may further include S33 to S34.

At block S33, a language model is obtained.

In at least one embodiment, the language model is a lightweight language model.

The lightweight language model may be, for example, a trained single-word model that includes thousands of words.

The language model can be pre-trained.

Accordingly, generating the search space by establishing the map may include: generating the search space by establishing the map according to the content edited by the developer, the anti-models and the garbage-models, and adding the language model behind a silent state of the search space.

For example, in establishing the map, "SIL" means the silent state, and the language model can be added behind "SIL", which can achieve certain rejection effect, and has certain fault tolerance. For example, when the user says "I want to make a phone call to XXX", but there is only "making a phone call to XXX" in the syntax rule, "I want to" will be absorbed by the language model, and "making a phone call to XXX" will enter the correct path, so as to be recognized correctly.

At the same time, due to an introduction of the language model in establishing the map, the speech recognition technology of the present disclosure can support long speech recognition, such that long speech monitoring task can be completed.

In some embodiments, with reference to FIG. 3, the method may include S34.

At block S34, the search space is generated by establishing the map according to the content edited by the developer, the anti-models and the garbage-models, the language model is added behind a silent state of the search space, and a preset identifier is added at a path end of the search space.

Figure 4:
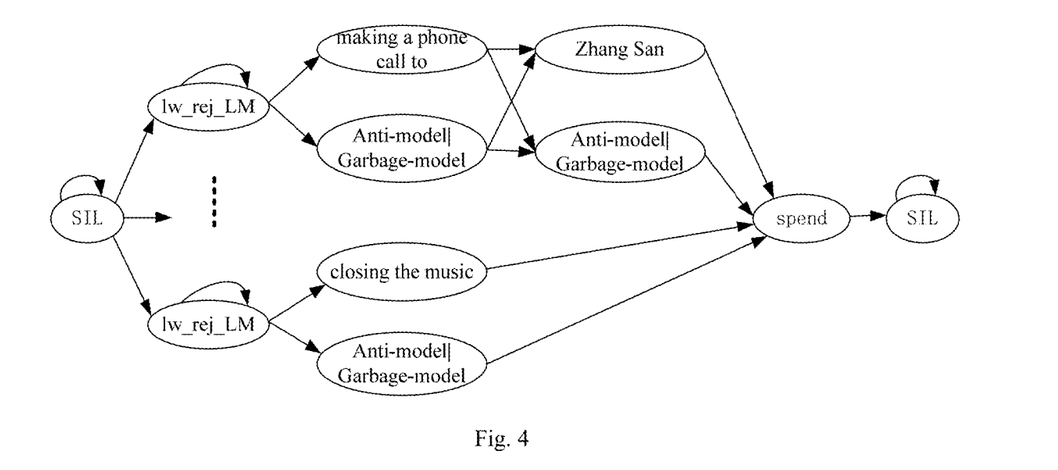
FIG. 4 is a schematic diagram of a search space generated by establishing a map according to an embodiment of the present disclosure.

The preset identifier may be represented such as "spend", with reference to FIG. 4. FIG. 4 is a schematic diagram of a search space generated by establishing the map according to an embodiment of the present disclosure. SIL means the silent state, Anti-model means the anti-model, Garbage-model means the garbage-model, and Lw_rej_LM means the lightweight language model.

By adding the preset identifier "spend" at the path end, the preset identifier can be included when the path is searched.

For example, with reference to FIG. 4, when the path of "making a phone call to"—"Zhang San"—"spend" is searched, the decoding result is outputted immediately without waiting until the end endpoint of the VAD, thereby improving a recognition speed.

After the search space is generated by establishing the map and the features of the speech signal is obtained, an optimal path can be determined by searching in the search space according to the features, and the decoding result can be determined according to relevant information on the optimal path.

Obtaining the decoding result can be executed by a decoder, and the decoder may be processed in per frame. Each frame of data can be such as 160 sample points, so that the decoder can process the data with a length of an integer multiple of 160 at one time. When the length of the data entering the decoder is not the integer multiple of 160, the remaining data will be stored in a buffer as the next input for processing.

In the path search, for example, the path that the features should go can be determined according to an acoustic model. In addition, for convenience of understanding, the search space in FIG. 4 is represented by characters. However, when the content in the search space is in Pinyin form, the keywords in the path can be converted from the Pinyin to the characters according to a pronunciation dictionary in order to output the characters. The acoustic model and the pronunciation dictionary can be loaded at initialization. In addition, at initialization, the language model required when establishing the map can also be loaded, and establishing the map can be completed according the above content, and a parameter configuration of the VAD and the front-end signal processing can be performed.

The decoding result includes, for example, a recognition result, a scene ID, a confidence value of the keyword, and the like.

The recognition result may include the keyword and the corresponding intentional object, which may be represented by "keyword: intentional object", for example, Zhang San: name. In addition, the recognition result may further include a non-intentional object and its identifier, a garbage word and its identifier, and the anti-model and its identifier, for example, making a phone call: AT, in which, AT is the non-intentional object's identifier; Laming: GW, blowing: GW, in which, "laming" is the garbage word, and "blowing" is the anti-model, the garbage word's identifier and the anti-model's identifier can be represented by the same identifier "GW".

Supposing that the user says "making a phone call to Zhang San", the recognition result is: SIL making a phone call to: AT Zhang San: name SIL: spend.

The scene ID may be determined according to the content in the recognition result. For example, the recognition result includes "making a phone call to". Since the scene ID corresponding to "making a phone call to" in the content edited by the developer is ID_0, ID_0 can be outputted.

In addition, in the path search, the confidence value of each keyword can be determined, for example, the confidence value of "Zhang San", so that the confidence value of the keyword can be obtained.

At block S13, it is judged whether a rejection is needed according to the decoding result.

At block S14, when the rejection is needed, it is determined that a speech recognition result is the rejection, and when the rejection is not needed, the speech recognition result is obtained according to the decoding result.

Figure 5:
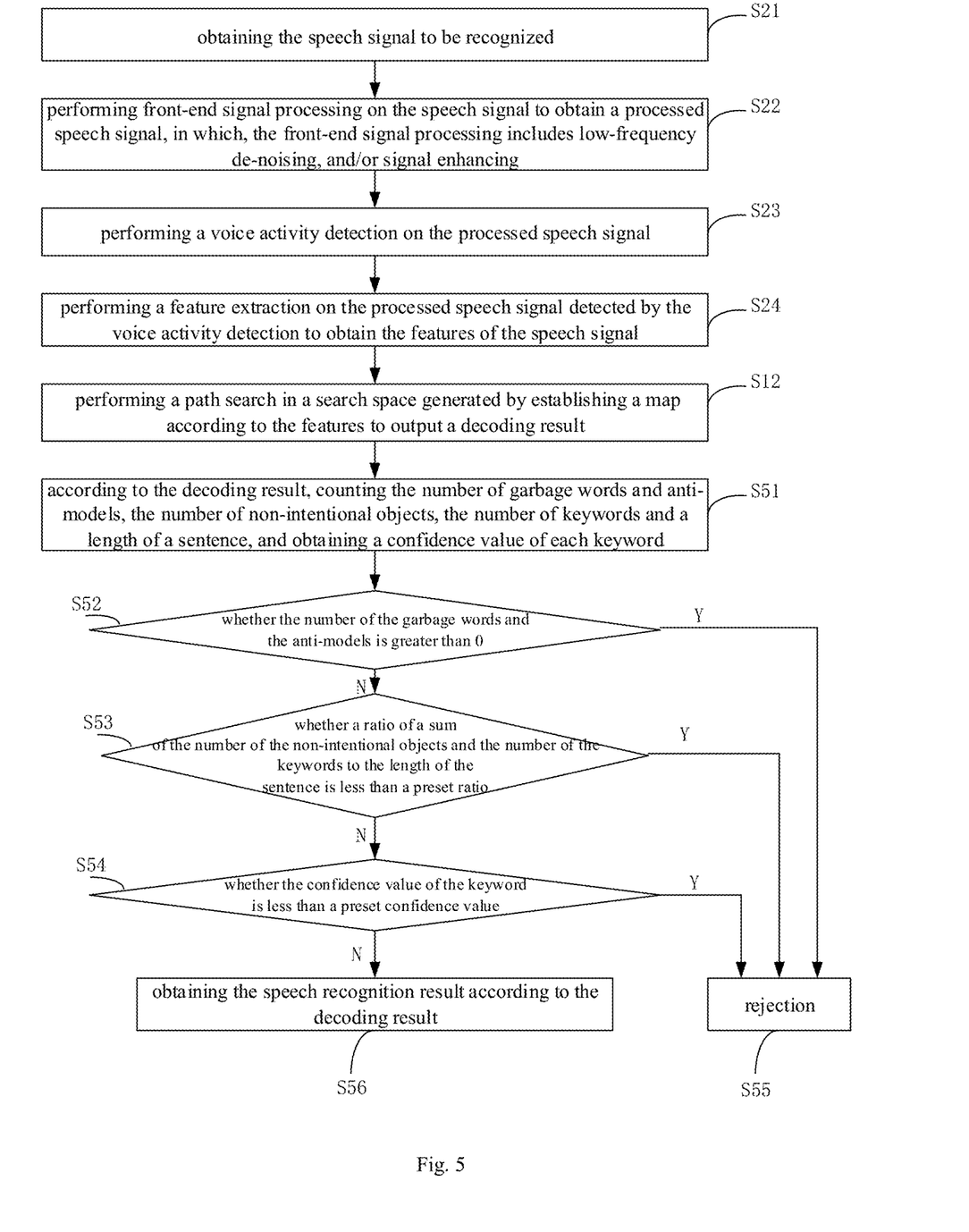
FIG. 5 is a flow chart of a speech recognition method according to another embodiment of the present disclosure.

In some embodiments, with reference to FIG. 5, acts after decoding can include S51 to S56.

At block S51, according to the decoding result, the number of garbage words and anti-models, the number of non-intentional objects, the number of keywords and a length of a sentence are counted, and a confidence value of each keyword is obtained.

For example, the decoding result includes the recognition result, and the garbage word and the anti-model are be marked in the recognition result, for example, "GW" is used to mark, and then the number of "GW" can be counted, so that the number of the garbage words and the anti-models can be obtained.

In addition, the recognition result may mark the non-intentional object, for example, "AT" is used to mark, and then the number of "AT" can be counted, so that the number of the non-intentional objects can be obtained.

In addition, the recognition result may include the keyword, such as "Zhang San", and then the number of keywords can be counted.

The length of the sentence is the number of all words included in the speech signal, such as a sum of the non-intentional objects, the keywords, the garbage words and the anti-models, thus, the length of the sentence can be obtained.

The decoding result may include the confidence value of the keyword, thus, the confidence value of the keyword can be obtained.

At block S52, it is judged whether the number of the garbage words and the anti-models is greater than 0, if so, S55 is executed, otherwise, S53 is executed. The rejection is judged.

For example, when the counted number of "GW" is greater than 0, and then the rejection is needed.

At block S53, a ratio of a sum of the number of the non-intentional objects and the number of the keywords to the length of the sentence is determined, and it is judged whether the ratio is less than a preset ratio, if so, S55 is executed, otherwise, S54 is executed. The rejection is judged.

For example, (the number of "AT"+the number of keywords)/the length of sentence can be calculated to obtain the ratio, when the ratio is less than the preset ratio, and then the rejection is judged.

At block S54, it is judged whether the confidence value of the keyword is less than a preset confidence value, if so, S55 is executed, otherwise, S56 is executed.

When there are multiple keywords are recognized, a maximum confidence value can be compared with the preset confidence value.

For example, "calling a job number of some person", in which, "some person" and "job" are keywords, the maximum confidence value in the multiple keywords can be compared with a threshold, and when the maximum confidence value is greater than the threshold, all the keywords may be recognized correctly, otherwise, the rejection is needed.

At block S55, the rejection is needed.

At block S56, the speech recognition result is obtained according to the decoding result.

The speech recognition result may be outputted according to the desire of the developer, and the speech recognition result includes, such as the scene ID, the keywords, and the corresponding intentional objects, and the confidence values of the keywords.

Since the above information is included in the decoding result, the desired speech recognition result can be obtained from the decoding result.

For example, the obtained speech recognition result may be expressed as: "scene ID keyword: intentional object confidence of keyword".

The speech recognition can be achieved once through the above acts.

In some embodiments, the speech recognition scene may be reset after completing the speech recognition once, for example, the scene can be reset by a resetting module, and the scene is given by a syntax file. The VAD, the decoder and the front-end signal processing module can be reset, so as to avoid an association with historical speech data, thereby supporting multi-scene loading.

In some embodiments, after the speech recognition is completed once, resource may be released. For example, the resource to be used by the decoder, the rejection judgment and front-end signal processing can be released by a resource releasing module.

In this embodiment, by judging whether the rejection is needed, the rejection processing is performed if necessary, thereby having the good rejection effect, and improving recognition accuracy due to the existence of the rejection. By performing the front-end signal processing, strong anti-noise performance can be achieved. By adding the language model in establishing a map, certain fault tolerance can be allowed, and long speech recognition can be supported, and long speech monitoring task can be completed. The present disclosure can be applied to the off-line speech recognition, and the speech recognition service can completed locally without network support. Through the above-mentioned syntax editing rule of the developer, the learning cost is low and it is easy to edit.

Figure 6:
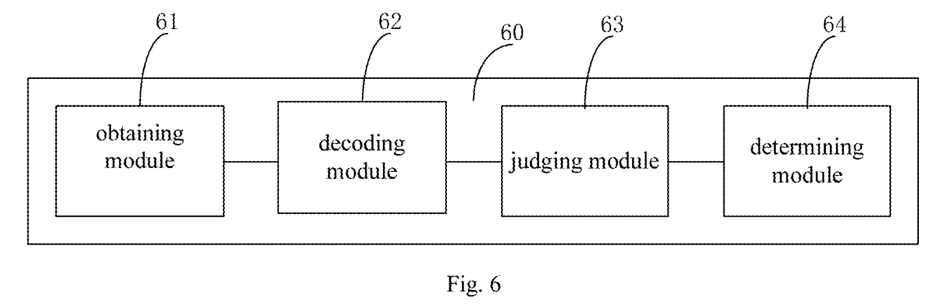
FIG. 6 is a block diagram of a speech recognition device according to another embodiment of the present disclosure.

FIG. 6 is a block diagram of a speech recognition device according to another embodiment of the present disclosure. The device 60 includes an obtaining module 61, a decoding module 62, a judging module 63 and a determining module 64.

The obtaining module 61 is configured to obtain features of a speech signal to be recognized.

In some embodiments, the obtaining module 61 is configured to: obtain the speech signal to be recognized; perform front-end signal processing on the speech signal to obtain a processed speech signal, in which, the front-end signal processing includes low-frequency de-noising, and/or signal enhancing; perform a voice activity detection on the processed speech signal; and perform a feature extraction on the processed speech signal detected by the voice activity detection to obtain the features of the speech signal.

The decoding module 62 is configured to perform a path search in a search space generated by establishing a map according to the features to output a decoding result.

Figure 7:
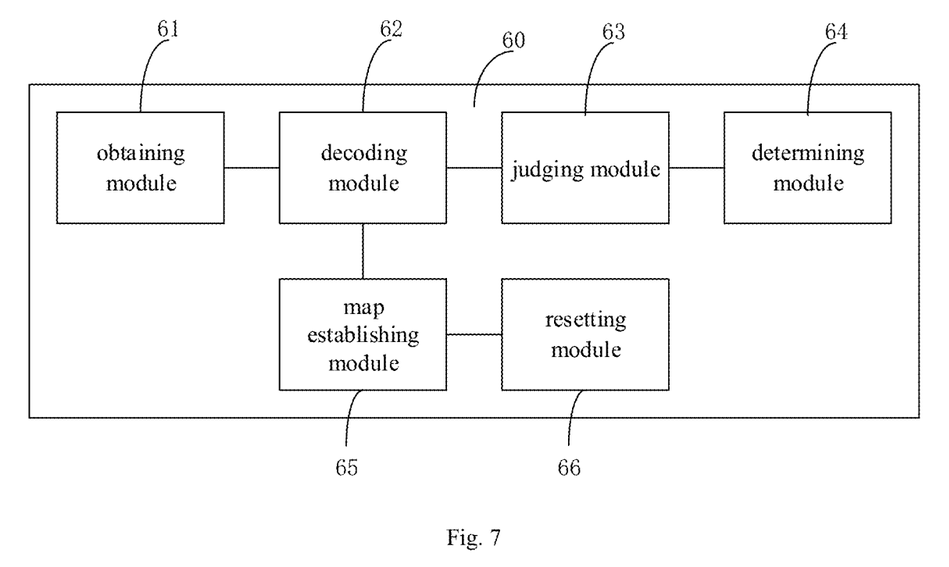
FIG. 7 is a block diagram of a speech recognition device according to another embodiment of the present disclosure.

In some embodiments, with reference to FIG. 7, the device 60 further includes a map establishing module 65.

The map establishing module 65 is configured to: obtain a content edited by a developer; determine intentional objects and non-intentional objects in the content, and obtain anti-models and garbage-models corresponding to the intentional objects and anti-models and garbage-models corresponding to the non-intentional objects; and generate the search space by establishing the map according to the content edited by the developer, the anti-models and the garbage-models.

In at least one embodiment, the map establishing module 65 is further configured to: obtain a language model, and add the language model behind a silent state of the search space when the search space is generated by establishing the map.

In at least one embodiment, the map establishing module 65 is further configured to add a preset identifier at a path end of the search space, so as to output the decoding result in real time when the path search is performed to include the preset identifier.

The judging module 63 is configured to judge whether a rejection is needed according to the decoding result.

In some embodiments, the judging module 63 is further configured to: according to the decoding result, count the number of garbage words and anti-models, the number of non-intentional objects, the number of keywords and a length of a sentence, and obtain a confidence value of each keyword; when the number of the garbage words and the anti-models is greater than 0, determine that the rejection is needed; or determine a ratio of a sum of the number of the non-intentional objects and the number of the keywords to the length of the sentence, and when the ratio is less than a preset ratio, determine that the rejection is needed; or when the confidence value of the keyword is less than a preset confidence value, determine that the rejection is needed.

The determining module 64 is configured to determine that a speech recognition result is the rejection, when the rejection is needed, and to obtain the speech recognition result according to the decoding result when the rejection is not needed.

In some embodiments, with reference to FIG. 7, the device 60 further includes a resetting module 66.

The resetting module 66 is configured to reset a speech recognition scene after the speech recognition result is obtained.

In addition, the device further includes a resource releasing module, configured to release resource needed for the next speech recognition after the speech recognition.

The specific content of the above modules can refer to related descriptions in the above embodiments of the method, which will not be described here.

In this embodiment, by judging whether the rejection is needed, the rejection processing is performed if necessary, thereby having the good rejection effect, and improving recognition accuracy due to the existence of the rejection. By performing the front-end signal processing, strong anti-noise performance can be achieved. By adding the language model in establishing a map, certain fault tolerance can be allowed, and long speech recognition can be supported, long speech monitoring task can be completed. The present disclosure can be applied to the off-line speech recognition, and the speech recognition service can be completed locally without network support. Through the above-mentioned syntax editing rule of the developer, the learning cost is low and it is easy to edit.

Embodiments of the present disclosure also provide an electronic device. The device electronic includes one or more processors; a memory; one or more programs stored in the memory, in which when the one or more programs are executed by the one or more processors to perform: obtaining features of a speech signal to be recognized; performing a path search in a search space generated by establishing a map according to the features to output a decoding result; judging whether a rejection is needed according to the decoding result; and when the rejection is needed, determining that a speech recognition result is the rejection, and when the rejection is not needed, obtaining the speech recognition result according to the decoding result.

Embodiments of the present disclosure also provide a non-transitory computer-readable storage medium having stored therein one or more modules that, when executed by a device, causes the device to perform: obtaining features of a speech signal to be recognized; performing a path search in a search space generated by establishing a map according to the features to output a decoding result; judging whether a rejection is needed according to the decoding result; and when the rejection is needed, determining that a speech recognition result is the rejection, and when the rejection is not needed, obtaining the speech recognition result according to the decoding result.

It is to be understood that, in the description of the present disclosure, terms of "first" and "second" are only used for description and cannot be seen as indicating or implying relative importance. Furthermore, unless otherwise explained, it is to be understood that a term of "a plurality of" refers to two or more.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in an almost simultaneous way or in an opposite order, which should be appreciated by those having ordinary skills in the art to which embodiments of the present disclosure belong.

It should be understood that, each part of the present disclosure may be implemented by the hardware, software, firmware or the combination thereof. In the above embodiments of the present disclosure, the plurality of procedures or methods may be implemented by the software or hardware stored in the computer memory and executed by the proper code execution system. For example, if the plurality of procedures or methods is to be implemented by the hardware, like in another embodiment of the present disclosure, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It may be understood by those skilled in the art that all or part of the steps in the method of the above embodiments may be implemented by instructing related hardware via programs, the program may be stored in a computer readable storage medium, and the program includes one step or combinations of the steps of the method when the program is executed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The above-mentioned storage medium may be a read-only memory, a magnetic disc, an optical disc, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in an embodiments," "in some embodiment", "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments cannot be construed to limit the present disclosure, and changes, alternatives, and modifications may be made in the embodiments without departing from spirit, principles and scope of the present disclosure.

What is claimed is:

1. A speech recognition method, performed by at least one computing device and comprising:
    obtaining, by the at least one computing device, features of a speech signal to be recognized;
    performing, by the at least one computing device, a path search in a search space generated by establishing a map according to the features to output a decoding result;
    judging, by the at least one computing device, whether a rejection is needed according to the decoding result; and
    when the rejection is needed, determining, by the at least one computing device, that a speech recognition result is the rejection, and when the rejection is not needed, obtaining, by the at least one computing device, the speech recognition result according to the decoding result;
    wherein the method further comprises:
        obtaining, by the at least one computing device, a content edited by a developer;
        determining, by the at least one computing device, intentional objects and non-intentional objects in the content, and obtaining, by the at least one computing device, anti-models and garbage-models corresponding to the intentional objects and anti-models and garbage-models corresponding to the non-intentional objects; and
        generating, by the at least one computing device, the search space by establishing the map according to the content edited by the developer, the anti-models and the garbage-models.

2. The method according to claim 1, wherein judging, by the at least one computing device, whether a rejection is needed according to the decoding result comprises:
    according to the decoding result, counting, by the at least one computing device, the number of garbage words and anti-models, the number of non-intentional objects, the number of keywords and a length of a sentence, and obtaining, by the at least one computing device, a confidence value of each keyword;
    when the number of the garbage words and the anti-models is greater than 0, determining, by the at least one computing device, that the rejection is needed; or
    determining, by the at least one computing device, a ratio of a sum of the number of the non-intentional objects and the number of the keywords to the length of the sentence, and when the ratio is less than a preset ratio, determining, by the at least one computing device, that the rejection is needed; or
    when the confidence value of the keyword is less than a preset confidence value, determining, by the at least one computing device, that the rejection is needed.

3. The method according to claim 1, further comprising:
    obtaining, by the at least one computing device, a language model, and adding, by the at least one computing device, the language model behind a silent state of the search space when generating the search space by establishing the map.

4. The method according to claim 1, further comprising:
adding, by the at least one computing device, a preset identifier at a path end of the search space to output the decoding result in real time when performing the path search to comprise the preset identifier.

5. The method according to claim 1, wherein obtaining, by the at least one computing device, features of a speech signal to be recognized comprises:
obtaining, by the at least one computing device, the speech signal to be recognized;
performing, by the at least one computing device, front-end signal processing on the speech signal to obtain a processed speech signal, wherein, the front-end signal processing comprises low-frequency de-noising, and/or signal enhancing;
performing, by the at least one computing device, a voice activity detection on the processed speech signal; and
performing, by the at least one computing device, a feature extraction on the processed speech signal detected by the voice activity detection to obtain the features of the speech signal.

6. The method according to claim 1, further comprising:
resetting, by the at least one computing device, a speech recognition scene after obtaining the speech recognition result.

7. An electronic device, comprising:
one or more processors;
a memory;
one or more programs stored in the memory and executable by the one or more processors, wherein the one or more processors are configured to perform acts of:
obtaining features of a speech signal to be recognized;
performing a path search in a search space generated by establishing a map according to the features to output a decoding result;
judging whether a rejection is needed according to the decoding result; and
when the rejection is needed, determining that a speech recognition result is the rejection, and when the rejection is not needed, obtaining the speech recognition result according to the decoding result;
wherein the one or more processors are further configured to perform acts of:
obtaining a content edited by a developer;
determining intentional objects and non-intentional objects in the content, and obtaining anti-models and garbage-models corresponding to the intentional objects and anti-models and garbage-models corresponding to the non-intentional objects; and
generating the search space by establishing the map according to the content edited by the developer, the anti-models and the garbage-models.

8. A non-transitory computer-readable storage medium having stored therein one or more modules that, when executed by a device, causes the device to perform a speech recognition method, the method comprising:
obtaining features of a speech signal to be recognized;
performing a path search in a search space generated by establishing a map according to the features to output a decoding result;
judging whether a rejection is needed according to the decoding result; and
when the rejection is needed, determining that a speech recognition result is the rejection, and when the rejection is not needed, obtaining the speech recognition result according to the decoding result;
wherein the method further comprises:
obtaining a content edited by a developer;
determining intentional objects and non-intentional objects in the content, and obtaining anti-models and garbage-models corresponding to the intentional objects and anti-models and garbage-models corresponding to the non-intentional objects; and
generating the search space by establishing the map according to the content edited by the developer, the anti-models and the garbage-models.

9. The electronic device according to claim 7, wherein the one or more processors are configured to judge whether a rejection is needed according to the decoding result by acts of:
according to the decoding result, counting the number of garbage words and anti-models, the number of non-intentional objects, the number of keywords and a length of a sentence, and obtaining a confidence value of each keyword;
when the number of the garbage words and the anti-models is greater than 0, determining that the rejection is needed; or
determining a ratio of a sum of the number of the non-intentional objects and the number of the keywords to the length of the sentence, and when the ratio is less than a preset ratio, determining that the rejection is needed; or
when the confidence value of the keyword is less than a preset confidence value, determining that the rejection is needed.

10. The electronic device according to claim 7, wherein the one or more processors are further configured to perform acts of:
obtaining a language model, and adding, by the at least one computing device, the language model behind a silent state of the search space when generating the search space by establishing the map.

11. The electronic device according to claim 7, wherein the one or more processors are further configured to perform acts of:
adding a preset identifier at a path end of the search space to output the decoding result in real time when performing the path search to comprise the preset identifier.

12. The electronic device according to claim 7, wherein the one or more processors are configured to obtain features of a speech signal to be recognized by acts of:
obtaining the speech signal to be recognized;
performing front-end signal processing on the speech signal to obtain a processed speech signal, wherein, the front-end signal processing comprises low-frequency de-noising, and/or signal enhancing;
performing a voice activity detection on the processed speech signal; and
performing a feature extraction on the processed speech signal detected by the voice activity detection to obtain the features of the speech signal.

13. The electronic device according to claim 7, wherein the one or more processors are further configured to perform acts of:
resetting a speech recognition scene after obtaining the speech recognition result.

14. The non-transitory computer-readable storage medium according to claim 8, wherein judging whether a rejection is needed according to the decoding result comprises:
- according to the decoding result, counting the number of garbage words and anti-models, the number of non-intentional objects, the number of keywords and a length of a sentence, and obtaining a confidence value of each keyword;
- when the number of the garbage words and the anti-models is greater than 0, determining that the rejection is needed; or
- determining a ratio of a sum of the number of the non-intentional objects and the number of the keywords to the length of the sentence, and when the ratio is less than a preset ratio, determining that the rejection is needed; or
- when the confidence value of the keyword is less than a preset confidence value, determining that the rejection is needed.

15. The non-transitory computer-readable storage medium according to claim 8, wherein the method further comprises:
- obtaining a language model, and adding, by the at least one computing device, the language model behind a silent state of the search space when generating the search space by establishing the map.

16. The non-transitory computer-readable storage medium according to claim 8, wherein the method further comprises:
- adding a preset identifier at a path end of the search space to output the decoding result in real time when performing the path search to comprise the preset identifier.

17. The non-transitory computer-readable storage medium according to claim 8, wherein obtaining features of a speech signal to be recognized comprises:
- obtaining the speech signal to be recognized;
- performing front-end signal processing on the speech signal to obtain a processed speech signal, wherein, the front-end signal processing comprises low-frequency de-noising, and/or signal enhancing;
- performing a voice activity detection on the processed speech signal; and
- performing a feature extraction on the processed speech signal detected by the voice activity detection to obtain the features of the speech signal.

* * * * *